US009104767B2

(12) United States Patent
Suh et al.

(10) Patent No.: US 9,104,767 B2
(45) Date of Patent: Aug. 11, 2015

(54) IDENTIFYING WEB PAGES THAT ARE LIKELY TO GUIDE BROWSING VIEWERS TO IMPROVE CONVERSION RATE

(75) Inventors: Bongwon Suh, Cupertino, CA (US); Eunyee Koh, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 370 days.

(21) Appl. No.: 13/597,155

(22) Filed: Aug. 28, 2012

(65) Prior Publication Data
US 2014/0068407 A1 Mar. 6, 2014

(51) Int. Cl.
*G06F 17/00* (2006.01)
*G06F 17/30* (2006.01)
*G06Q 30/02* (2012.01)

(52) U.S. Cl.
CPC .... *G06F 17/30867* (2013.01); *G06F 17/30014* (2013.01); *G06Q 30/02* (2013.01)

(58) Field of Classification Search
CPC ............... G06F 17/30876; G06F 17/30861; G06F 17/30867; G06F 17/30011; G06F 17/3053; G06F 17/2235; G06F 17/30882; G06F 17/3089
USPC .......................................... 715/205, 208, 234
See application file for complete search history.

(56) References Cited

U.S. PATENT DOCUMENTS

| | | | |
|---|---|---|---|
| 6,018,748 A * | 1/2000 | Smith | 715/207 |
| 6,237,006 B1 * | 5/2001 | Weinberg et al. | 707/797 |
| 6,282,548 B1 * | 8/2001 | Burner et al. | 1/1 |
| 6,470,383 B1 * | 10/2002 | Leshem et al. | 709/223 |
| 6,643,651 B1 * | 11/2003 | Pearsall | 1/1 |
| 7,930,391 B1 * | 4/2011 | Holt | 709/224 |
| 7,979,457 B1 * | 7/2011 | Garman | 707/768 |
| 2003/0128231 A1 * | 7/2003 | Kasriel et al. | 345/736 |
| 2004/0003351 A1 * | 1/2004 | Sommerer et al. | 715/517 |
| 2006/0036400 A1 * | 2/2006 | Kasriel et al. | 702/182 |
| 2007/0038659 A1 * | 2/2007 | Datar et al. | 707/101 |
| 2007/0156594 A1 * | 7/2007 | McGucken | 705/51 |
| 2008/0140697 A1 * | 6/2008 | Papadimitriou et al. | 707/102 |
| 2011/0202522 A1 * | 8/2011 | Ciemiewicz et al. | 707/711 |

OTHER PUBLICATIONS

Punin, John R., et al, "LOGML: Log Markup Language for Web Usage Mining," Rensselaer Polytechnic Institute, Troy, NY, WEBKDD2001—Mining Web Log Data Across All Customers Touch Points, Third International Workshop, 2001, pp. 1-12.*
El-Sayed, Maged, et al, "FS-Miner: Efficient and Incremental Mining of Frequent Sequence Patterns in Web Logs," Proceedings of the 6th Annual ACM International Workshop on Web Information and Data Management, ACM, 2004, pp. 128-135.*

* cited by examiner

*Primary Examiner* — Laurie Ries
(74) *Attorney, Agent, or Firm* — Shook, Hardy & Bacon L.L.P.

(57) ABSTRACT

A method and system for extracting from a web log for a given entity information comprising web page events. The information gain in the sequence of navigating from a given web page to a subsequent web page is computed for at least some of the web page events. The information gain is used to determine a set of web pages from which users can decide to navigate to a first web page or a second web page, wherein navigating to the first web page is more likely to lead to a conversion than navigating to the second web page. A list of at least a subset of the set of web pages is transmitted to the entity, which can use the list to determine web pages at which the entity can place advertising material to motivate a user to navigate to the first web page. The computing may be performed by MapReduce processing.

23 Claims, 5 Drawing Sheets

IDENTIFYING WEB PAGES THAT ARE LIKELY TO GUIDE BROWSING VIEWERS TO IMPROVE CONVERSION RATE

TECHNICAL FIELD

This application relates to the technical fields of software and/or hardware technology and, in one example embodiment, to system and method for determining web pages that are more likely than others to lead to sales or other conversions.

BACKGROUND

Among many (millions) pages in websites, some pages are more important than others. Popular pages and popular browsing trails are one example, where browsing trails can be considered to mean a sequence of page landings. It is possible to identify which pages/trails can guide people to a sequence of page landings to convert their browsing to a commercially favorable action. For example, conversion can be downloading a file, adding a product to a cart, sending credit card information to purchase the product, and like actions. Navigation decision points that can lead to pages and trails that are more likely to lead to conversion will be critically important in terms of focusing the browsing party's attention toward navigating to a page/trail that is likely to lead to a conversion, as compared with other pages/trails that do not, or are unlikely, to lead to a conversion. These navigation decision points may be determined by mining web log data and extracting therefrom data about successful website conversions using user click data such as timestamps, urls, checkout data, and purchase/conversion information. Knowing these navigation decision points can benefit digital marketers by giving them better insights about users' conversion behavior and direct the users to focus more attention on their critical webpage "forks" to increase conversion rates. In this context, the term "forks" can be considered to be used metaphorically to signify a page at which a user makes a decision to navigate from one web page to another web page. The resulting insight can also be useful to improve prediction and recommendation capabilities.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
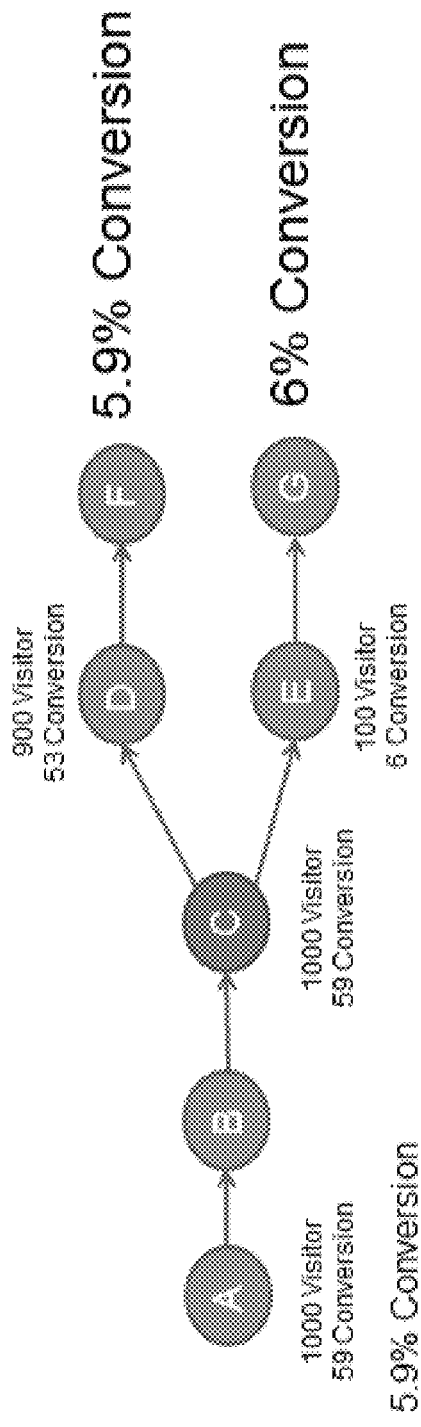
FIG. 1 is a diagrammatic representation of determining information gain in page trails.

A method and a system are described that can calculate important "forks in the road" by applying information theory to page navigation data that is obtained by minining web log data and traffic statistics. The term "forks" is used metaphorically. A browsing party moving from node to node when browsing can be said to perform a fork. As one example, an important fork in the road can be considered to be a web page at which the user can decide to navigate to one of two web pages, one of which is significantly more likely than other to lead to ultimate conversion. Knowing the most important, or an important, fork in the road, or crossroad, can be important for marketing purposes. The method and the system herein described would enable digital marketers to receive daily (or on demand) reports of important "fork" pages sorted by the measure of the techniques described herein, and to interactively view browsing trails related to those pages. Such marketers could utilize this information of which nodes are likely to lead to conversion as the basis for modifying their website to optimize users' browsing experiences and/or to guide users to navigate to a web page that is likely to lead to conversion. The term "conversion" as used herein may be viewed as an action the user takes that the marketer regards as favorable. Such actions include, without limitation, downloading patterns like downloading a file or downloading a product into a cart, or purchase patterns like providing credit card information, or executing a transaction, and similar patterns that are of interest to the marketer. In addition, such marketers may develop different pricing models for advertisement spots of or at those key or important pages, or to offer such incentives as ads or coupons at that point to motivate the user to navigate to a preferred page. Stated another way, embodiments herein described may be used to guide people to convert by helping them navigate to a given page when they are at important forks in the roads. The embodiments herein will describe how to identify important forks in the road and, therefore, where to place advertisements, coupons, and the like, effectively. This can add to efficiency of a marketing campaign because screen estate on popular pages is expensive. Using a street example, one would normally not distribute coupons in front of a McDonalds® restaurant because there is little or no added value in distributing them at a point where the customer has most likely already decided to purchase at McDonalds. A more efficient method, in a browsing sense, is to "help" visitors convert (by placing ads, coupons, and the like) when the visitors are at forks in the road at which they can decide to navigate to a page that has a good likelihood of leading to converting. Finding the important forks in the road can be accomplished by applying user based analytics versus URL based analytics. This is beneficial because it yields per-page results, is less complicated than URL based analytics, and is easier to understand. Further, such analytics can be customized for each key performance indicator (KPI). That is, most forks in the road pages are for events such as Purchase/Download, Cart addition, credit card. This can, of course complement other efforts. For example, given user segments, the method can be used to identify the most effective pages to navigate to for a certain KPI.

To identify these important forks in the road, an algorithm based on information theory and also on Information Gain theory may be used by a computational device. The algorithm applies information theory for each page by mining web log data and traffic statistics. The method and the system would enable digital marketers to receive daily (or on demand) reports of important "fork" pages sorted by the measure of the techniques described here, and interactively view browsing trails related to those pages. As discussed above, such digital marketers could profitably utilize this information to modify their website to motivate users to make navigational decisions that lead to ultimate conversion, such as downloading a file, or visiting a product page, and eventually purchasing the product. In the description herein, pages may sometimes be referred to as nodes.

The embodiments involve information theory, which is a branch of applied mathematics and electrical engineering involving the quantification of information. Information theory was developed by Claude E. Shannon to find fundamental limits on signal processing operations such as compressing data and on reliably storing and communicating data. A key measure of information is known as Entropy, which is usually expressed by the average number of bits needed to store or communicate one symbol in a message. Entropy quantifies the uncertainty involved in predicting the value of random variables. For example, specifying the outcome of a fair coin flip (two equally likely outcomes) provides lower Entropy than specifying the outcome from a roll of a die (six equally likely outcomes).

In this regard, Entropy, which is a measure of uncertainty, can be defined according to Shannon's equation as:

$$H(X) = -\sum_{i=1}^{n} p(x_i) \log_b p(x_i) \quad (1)$$

where H(X) is the Shannon Entropy for a random variable X with possible values $\{x_i: i=1, \ldots, n\}$; and
$p(x_i)$ is the probability mass function of outcome $x_i$.

One way to visualize the concept of Entropy is to consider a body of water. If the surface of the water is calm there is a certain amount of Entropy represented. If, however, the water comprises a wave, such as in the ocean, there can be considered to be more information in the wave, and therefore less Entropy than a calm water surface.

In general terms, expected Information Gain is the change in information Entropy from a prior state to a state that takes some information. Information Gain is given as:

$$IG(T,a) = H(T) - H(T|a) \quad (2)$$

Where IG is Information Gain
H(t) is the Entropy before, calculated using Equation (1); and
H(T|a) is the Entropy after, also calculated using the Equation (1).

"Forks in the Road," or "pages/trails" which may guide browsing users to convert their browsing to sales can be identified by implementing the novel algorithm disclosed herein that is based on information theory and on Information Gain theory.

Figure 2:
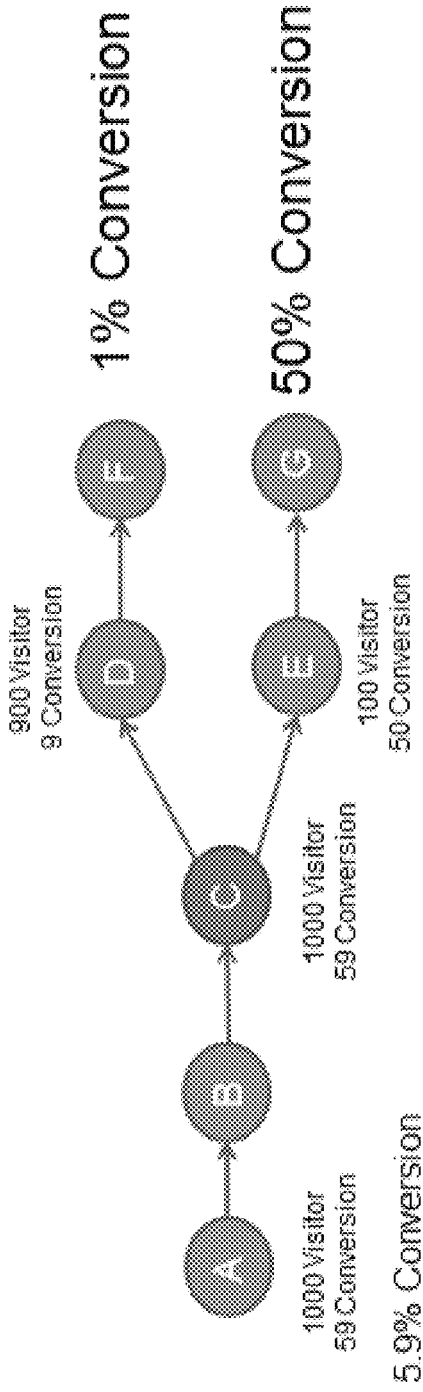
FIG. 2 is another diagrammatic representation of determining information gain in page trails.

FIGS. 1 and 2 show simple examples of web page trails and illustrate how to calculate Information Gain to identify important forks in the road.

With reference to FIG. 1, a web page C is illustrated that has 1000 visitors in a week, and 59 of those visitors actually have converted at a later page of their browsing path after they visited the page C, whether to downloading a file, adding a product to a cart, or to making actual purchases. Also illustrated is web page D, 5.9% of visitors to which ultimately converted at web page F. Also illustrated is web page E, 6% of visitors to which ultimately converted at web page G. Using this visitors data and conversion data, the Information Gain in the page C can be calculated using the Entropy formula, and the change in information Entropy from a prior state to a new state:

Applying the above equations Calculations with respect to in FIG. 1 are as follows, $$H_{before} = 0.32 = -[0.059 * log_2(0.059) + 0.941 * log_2(0.941)]$$
$$H_{after} = 0.32 = 900/1000 * -[0.059 * log_2(0.059) + 0.941 * log_2(0.941)] +$$
$$100/1000 * -[0.06 * log_2(0.06) + 0.94 * log_2(0.94)]$$
$$\text{Information Gain} = H_{before} - H_{after} = 0.0$$

Therefore, since the value of H before is essentially the same as H after, the Information Gain is seen to be zero, indicating there is no Information Gain before and after web page C. That is, whether a visitor navigates from web page C to either web page D or web page E, the result is that each of web pages D and E has approximately the same low conversation rate (5.9%, 6.0%, respectively). This may be interpreted to mean that web page C is not an important web page (i.e., not an important "fork in the road"), or is a web page of low importance, from which to guide visitors to convert.

FIG. 2 illustrates the same web page trails with slightly different data. The page C in FIG. 2 has the same conversion rate 5.9%, but the user deciding to navigate from web page C to web page D can have an important difference to a marketer from the user deciding to navigate from web page C to web page E. That is, a user navigating from web page C to web page D eventually converts at a 1% conversion rate at web page F. However, a user navigating from web page C to web pageE eventually converts at a 50% conversion rate at web page G. So web page C is an important fork in the road, or important crossroad, and the marketer would profit from motivating or directing users to navigate from web page C to web page E instead of navigating from web page C to web page D. By analyzing the Entropy and Information Gain with the conversion data, an Information Gain may be found in the web page C, as follows:

$$H_{before} = 0.32 = -[0.059 * log_2(0.059) + 0.941 * log_2(0.941)]$$
$$H_{after} = 0.17 = 900/1000 * -[0.01 * log_2(0.01) + 0.99 * log_2(0.99)] +$$
$$100/1000 * -[0.05 * log_2(0.05) + 0.5 * log_2(0.5)]$$
$$\text{Information Gain} = H_{before} - H_{after} = 0.15$$

This means that placing some information in the page C is important to guide visitors to navigate to a page, here page E, with a desirable probability of leading the visitor to convert. That is, in this instance it is important to direct people who are about to decide to navigate from web page C to decide to navigate to web page E to increase the probability of conversion. One way of achieving this is by, for example, providing users with an ad or coupons in web page C, which may encourage the users to navigate to web page E. If the user navigates to web page E there is a much higher probability of conversion than if the user navigates to web page D. Importantly, the algorithm has computed Information Gain from the sequences of navigation; that is, from web page C to web page D, and from web page C to web page E, in this example. While it has heretofore been possible to identify what is a conversion and what is not a conversion, the method described also identifies the importance of the paths leading to conversion. This allows a marketer to motivate a user to navigate from a first important node to a second node that has a desirable probability of leading to conversion, at a point at which the user is about to decide which of a plurality of nodes to navigate to.

Feature Extraction from Web Logs and Information Gain Computation in MapReduce:

As a further example, consider that an entity such as Adobe.com has web log data that indicates about 50 million page views per day. From the web log data feature engineering can be performed to extract the following four-tuples:

<User_id, Timestamp, URL, Conversion>
Example: <"1234_5678", 2012-01-04 10:20:54, www.adobe.com/cart.html, 1>

In the above example, a user "1234_5678" visited the URL wwxw.adobe.com/cart.html at the given time in the time stamp. This may be considered as a conversion action per marketer's predefined criteria. A marketer may define the conversion type he or she wishes to investigate beforehand, such as downloading patterns like downloading a file or downloading a product into a cart, or purchase patterns like providing credit card information and executing a transaction, and similar patterns that are of interest to the marketer. Thus the methods described herein may be performed with respect to predetermined conversion types as defined by the marketer.

Browsing is visiting a series of web pages. For each visiting of web pages of a browsing path, we can associate two web pages, the current web page that a user has loaded in his/her browser ("URL_from") and another page the user clicks to visit ("URL_to"). Then, MapReduce (for example, Hadoop) may be used to process the data from the above millions of views into the following form for each visiting activity as seen generally in FIG. 3:

<URL_from, URL_to, Eventual Conversion>
Where:
"URL_from" is the URL of the web page the user has navigated from (for example node C in the example of FIG. 2; and
"URL_to" is the URL of the web page the user has navigated to upon navigating from "URL_from, for example, node E of FIG. 2."
"Eventual Conversion" is a binary value (1: Converted, 0: Not converted) denoting that a visitor whose browsing path includes a transition between URL_from to URL_to eventually converts in his/her browsing session at a later part of navigation.
Example: <www.adobe.com, www.adobe.com/products/catalog.html, 1>

In the above example, the user navigated from "www.adobe.com" to "www.adobe.com/products/catalog.html". The user eventually did convert, which is to add a product into a cart in the visit as indicated by "1" above. Adding a product to the cart was the predetermined conversion pattern the marketer desired to investigate.

Figure 3:
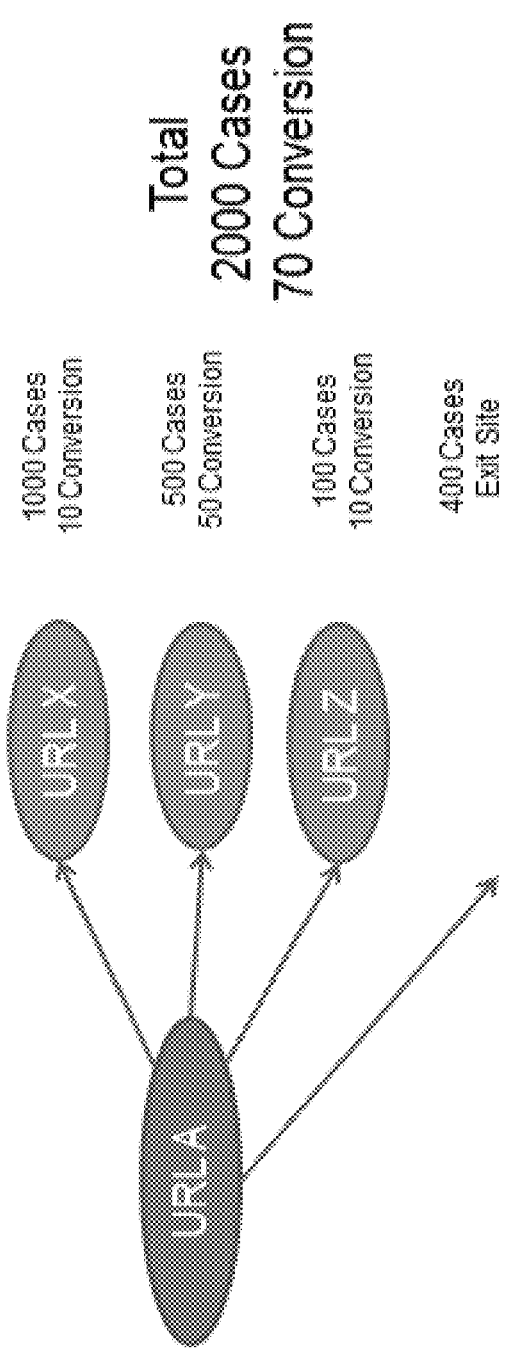
FIG. 3 is a diagrammatic representation of calculating information gain in navigating from one web page to another for a plurality of such navigations.

When the processing of the URL pairs and eventual KPI action triplets is complete, the results can be grouped by "URL_from" and MapReduce can be used, in one embodiment, to calculate conversions per subsequent path sequences for each "URL_from". This is seen in illustrative form in FIG. 3 where data are mined from a web log such as the web log of Adobe.com and "from-to" URL pairs are used to determine whether a path from "URL_from" to "URL_to" leads to a conversion in order to calculate the Information Gain. In FIG. 3 "URL_from" is URL A and "URL-to" in various navigation decisions by the user is URL X (which path has 1000 cases and 10 conversions); URL Y (which path has 500 cases and 50 conversions); URL Z (which path has 100 cases and 10 conversions); and 400 cases where the user exited the site from URL A, which treated as a path with 0 conversions. This comprises computing statistics for each path.

Figure 4:
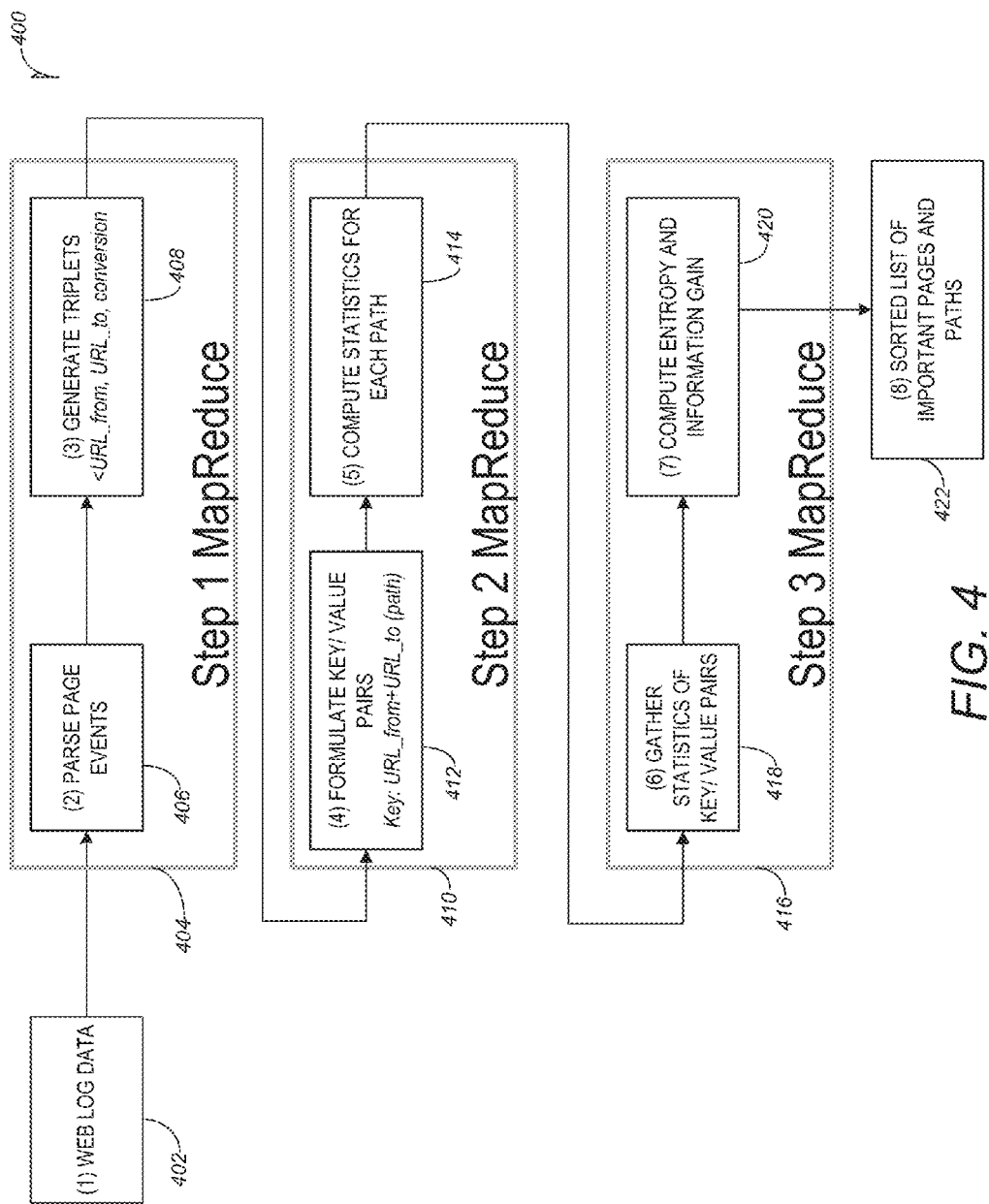
FIG. 4 is a flow chart of a method for determining important pages and navigation paths from web log data.

The above can be seen from the flow chart of FIG. 4. FIG. 4 illustrates method 400 of determining Information Gain in proceeding from a given node to a subsequent node in the sequence of navigation from one node (or web page) to another node (or web page). This is performed using web log data of millions of daily page views by visitors. The illustrated method may be performed on a per-customer basis in order to provide marketing information to customers as described above.

At 402, web log data input comprises web log files during a given period of time. In the context of data from a company such as Adobe Systems, the web log data would be obtained from an Omniture® data analytics product such as SiteCatalyst™. The customers of Adobe would be the marketers discussed above.

At 404 a first MapReduce step is illustrated, termed Step 1 for purposes of this example. At 404, step 406 parses customer pages events from the millions of page views from the web log data to extract page events such as page visit URLs and a conversion action of interest chosen among many conversion candidates such as purchase, download, add to cart, view product, provide credit card, and the like. As discussed above, the conversion type the marketer desires data for would be defined by the marketer beforehand. Step 408 then generates triplets, or other tuples, depending on the page views and conversion results. In step 408 in the current example, triplets are of the form <URL_from, URL_to, Conversion>, which indicates, respectively, the page from which a user navigates, the page to which the user navigates, and conversion results, depending on the conversion type predetermined by the marketer. Here the viewer viewed a product, added the product to the viewer's cart, or purchased the product. That is, this step shows the sequence of visits from users, and ultimate conversion is known from the above tuples.

At 410 step two is illustrated. At 412 the known sequence results from 408 are used to formulate key value pairs such as Key: "URL_from" and "URL_to" user paths and Value tuple as described below in Step 2, which is composed of "1" and Conversion. That is, in the context of MapReduce, which uses (Key, Value) pairs, we can use Value: <1, Conversion>. At 414 the statistics for each path is computed, in one embodiment, by counting the number of values for each Key. For example, count all the incidents of visiting which contains the path "URL_from" and "URL_to" and all the number of converted incidents among them. Step 3 is seen at 416. At 418 the method gathers statistics of Key/Value pairs using the results from 414. Entropy and Information Gain are calculated at 420 using the statistics information from 414 and 418 to calculate the Entropy and Information Gain for each Key (Page and Path) using Equation (1) and Equation (2). Step 422 shows the sorted list of important forks in the word (by information gain value) during a certain period of time. Marketers can then use this list for placing ads, coupons, and the like to guide the user to the path with a desirable probability of conversion as discussed above.

Below are illustrative Map Reduce steps that were discussed with respect to FIG. 4 showing how to compute the Information Gain from the above web visit log.

Step 1

Map: Parse web logs and extract web page events that matches conversion criteria..
    Input: Individual instance of web visit log
    Output: Key: UserId
        Value: URL, time stamp, conversion at the URL
        (1: True/ 0: False)

-continued

```
Reduce: From web logs and events, identify following triplets.
    Input: Key: UserId
        Value: List of < URL, time stamp, conversion at the URL>
    Procedure:
        1. Sort the list by time stamp so that the data can be ordered in
           the way that matches the user's visit sequence.
        2. Inspect the sorted list and check if there exists conversion in
           the sequence. If so, mark this sequence as a converted
           sequence.
        3. For each two adjacent items in the sorted list produce the
           following tuple
           Example sequence: < URL1, time stamp 1, 0>,
           < URL2, time stamp 2, 0 >, < URL10, time stamp, 1 >
           For URL1, produce the following <URL1, URL2, 1 >
    Output: <URL_from, URL_to, Conversion>
```

Step 2

```
Map: Formulate key/value pairs to calculate statistics for each URL pair.
Input: <URL_from, URL_to, Conversion>
Procedure: For each input, form the output
Output: Key: <URL_from, URL_to>
    Value: <1, Conversion>
Reduce: Calculate the number of total instances and converted instances
for each URL pair.
Input: Key: <URL_from, URL_to>
    Value: List of <1, Conversion>
Procedure:
    Sum up the input values by location. The sum of the first item (1 in
<1, Conversion>) in the value naturally represents the total incidents
of browsing activity comprised of URL_from to URL_to. The
sum of the second item in the value (Conversion in <1, Conversion>)
represents how many of them were involved in converting paths.
    for(Text value: values) {
        String line = value.toString( );
        String[ ] tokens = line.split("\t");
        total += Integer.parseInt(tokens[0]);
        converted += Integer.parseInt(tokens[1]);
    }
    context.write(new Text(URL_from + "\t" + URL_to),
    new Text(total + "\t" + converted);
```

Step 3

```
Map: Read key/value pairs from Step 2 output.
    Output: Key: URL_from
        Value: <URL_to, # total, # converted>
    String keyString = url_from;
    String valueString = url_to+"\t"+total+"\t"+converted;
    context.write(new Text(keyString), new Text(valueString));
Reduce: Compute Entropy and Information Gain for each URL_from
    Input: Key: URL_from
        Value: List of <URL_to, # total, #converted>
    for(Entry<URL, total, converted> value: values) {
        globalConverted = value.converted;
        globalTotal += value.total;
    }
    for(Entry<URL, total, converted> value: values) {
        double ratio = value.total/globalTotal;
        double p = value.converted/value.total; // local converted ratio
        afterEntropy += ratio*getEntropy(p);
    }
    double globalConversionRatio = globalConverted/globalTotal;
    double beforeEntropy = getEntropy(globalConversionRatio);
    double informationGain = beforeEntropy − afterEntropy;
```

One application for the above may be for a web analytics product like SiteCatalyst by Adobe Systems.® SiteCatalyst provides marketers with actionable, real-time web analytics intelligence about digital strategies and marketing initiatives. Adobe SiteCatalyst helps marketers quickly identify the most profitable paths through a website, segment traffic to spot high-value web visitors, determine where visitors are navigating away from the site, and identify critical success metrics for online marketing campaigns. Use of the above method would enable marketers to place ads or other incentives at desired points in the above paths through a website.

Another application of the above may be Adobe Test & Target™ which gives marketers a conversion website optimization tool with the necessary capabilities to continually make their online content and offers more relevant to their customers and yielding greater conversion. Test & Target provides an intuitive interface for designing and executing tests, creating audience segments and targeting content. By using the above method, Test & Target can analyze the marketer's website and provide the list of important pages to the marketer. The marketer can then utilize this information and the above method to locate more targeting contents/ads/offers to these important pages, which will help to improve overall conversion rate. The m can also execute live A/B testing (multivariate testing) to verify the conversion rate improvements.

Figure 5:
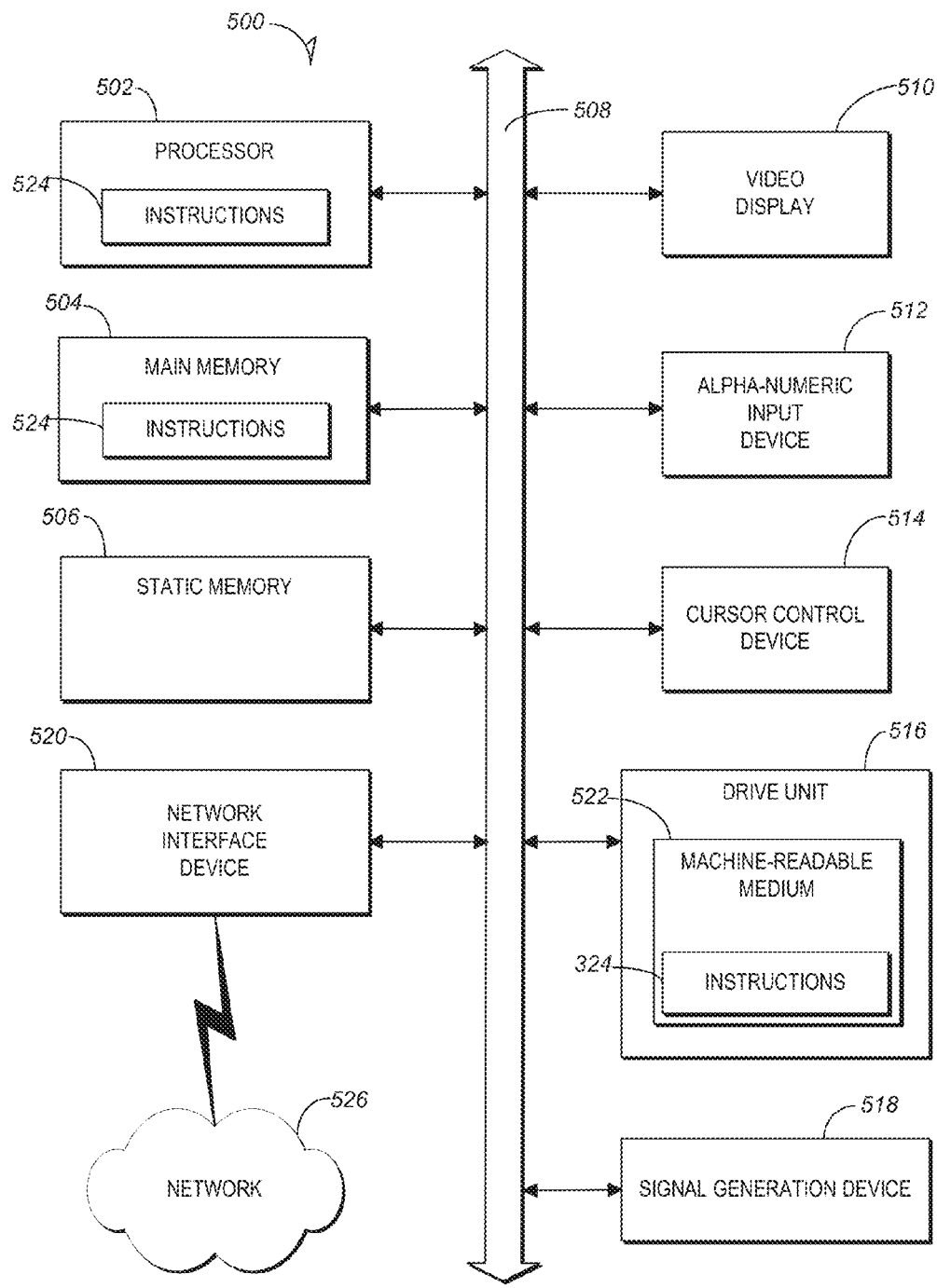
FIG. 5 is a diagrammatic representation of an example machine in the form of a computer system within which a set of instructions, for causing the machine to perform any one or more of the methodologies discussed herein, may be executed.

FIG. 5 shows a diagrammatic representation of a machine in the example form of a computer system 500 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 505. The computer system 500 may further include a video display unit 510 (e.g., a liquid crystal display (LCD) or a cathode ray tube (CRT)). The computer system 500 also includes an alpha-numeric input device 512 (e.g., a keyboard), a user interface (UI) navigation device 514 (e.g., a cursor control device), a disk drive unit 516, a signal generation device 518 (e.g., a speaker) and a network interface device 520.

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, with the main memory 504 and the processor 502 also constituting machine-readable media.

The software 524 may further be transmitted or received over a network 526 via the network interface device 520 utilizing any one of a number of well-known transfer protocols (e.g., Hyper Text Transfer Protocol (HTTP)).

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system for providing application-level auto-scaling in a cloud computing environment has been described. Although the method and system have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method comprising:
   using at least one computer processor, extracting from a web log information comprising web-page events;
   identifying from the web-page events a web page that is included in a trail of web pages, which guide browsing sessions to conversions on a plurality of browsed-to web pages that are browsed to after the web page;
   calculating a first entropy that quantifies an amount of conversion uncertainty in the trail of web pages before the one or more browsing sessions navigate to the web page;
   calculating a second entropy that quantifies an amount of conversion uncertainty in the trail of web pages after the one or more browsing sessions navigate to the web page; and
   computing an information gain from the first entropy to the second entropy, wherein the information gain suggests whether a significant conversion disparity exists among the plurality of browsed-to web pages.

2. The method of claim 1 further comprising transmitting a list of at least the web page for displaying to an entity.

3. The method of claim 1 wherein the conversions are customizable.

4. The method of claim 1 wherein the conversions comprise at least one of the group consisting of downloading a file, adding a product to a cart, sending credit card information, and purchasing the product.

5. The method of claim 1 wherein information extracted from the web-page events includes at least some of the group consisting of timestamps, LTRLs, credit card information, and product purchase information.

6. The method of claim 2 wherein the list indicates at least the web page at which the entity can place advertising material to motivate a user to navigate to one or more webpages of the plurality of browsed-to web pages that are browsed to after the web page.

7. The method of claim 1 wherein the computing comprises processing URL pairs that comprise a first URL from which users navigate and a second URL to which users navigate from the first URL.

8. The method of claim 7 wherein the computing comprises processing a MapReduce function.

9. A machine-readable storage device having stored therein a set of instructions which, when executed by the machine, causes the machine to execute the following operations:
   extracting from a web log information comprising web-page events;
   identifying from the web-page events a web page that is included in a trail of web pages, which guide browsing sessions to conversions on a plurality of browsed-to web pages that are browsed to after the web page;
   calculating a first entropy that quantifies an amount of conversion uncertainty in the trail of web pages before the one or more browsing sessions navigate to the web page;
   calculating a second entropy that quantifies an amount of conversion uncertainty in the trail of web pages after the one or more browsing sessions navigate to the web page; and
   computing an information gain from the first entropy to the second entropy, wherein the information gain suggests whether a significant conversion disparity exists among the plurality of browsed-to web pages.

10. The machine-readable storage device of claim 9 further comprising transmitting a list of at least the web page for displaying to an entity.

11. The machine-readable storage device of claim 9 wherein the conversions are customizable.

12. The machine-readable storage device of claim 9 wherein the conversions comprise at least one of the group consisting of downloading a file, adding a product to a cart, sending credit card information, and purchasing the product.

13. The machine-readable storage device of claim 9 wherein information extracted from the web-page events includes at least some of the group consisting of timestamps, URLs, credit card information, and product purchase information.

14. The machine-readable storage device of claim 10 wherein the indicates at least the web page at which the entity can place advertising material to motivate a user to navigate to one or more webpages of the plurality of browsed-to web pages that are browsed to after the web page.

15. The machine-readable storage device of claim 9 wherein the computing comprises processing URL pairs that comprise a first URL from which users navigate and a second URL to which users navigate from the first URL.

16. The machine-readable storage device of claim 15 wherein the computing comprises processing a MapReduce function.

17. A system comprising:
   at least one computer processor configured to
   extract from a web log information comprising web-page events;
   identify from the web-page events a web page that is included in a trail of web pages, which guide browsing sessions to conversions on a plurality of browsed-to web pages that are browsed to after the web page;
   calculate a first entropy that quantifies an amount of conversion uncertainty in the trail of web pages before the one or more browsing sessions navigate to the web page;

calculate a second entropy that quantifies an amount of conversion uncertainty in the trail of web pages after the one or more browsing sessions navigate to the web page; and compute an information gain from the first entropy to the second entropy, wherein the information gain suggests whether a significant conversion disparity exists among the plurality of browsed-to web pages.

18. The system of claim 17, the at least one computer processor further configured to transmit a list of at least the web page for display to an entity.

19. The system of claim 17 wherein conversions are customizable.

20. The system of claim 17 wherein the conversions comprise at least one of the group consisting of downloading a file, adding a product to a cart, sending credit card information, and purchasing the product.

21. The system of claim 17 wherein information extracted from the web-page events includes at least some of the group consisting of timestamps, URLs, credit card information, and product purchase information.

22. The system of claim 17 wherein the computing comprises processing URL pairs that comprise a first URL from which users navigate and a second URL to which users navigate from the first URL.

23. The system of claim 22 wherein the computing comprises processing a MapReduce function.

* * * * *